United States Patent [19]

Iliadis et al.

[11] Patent Number: 5,742,606
[45] Date of Patent: Apr. 21, 1998

[54] SWITCHING APPARATUS AND METHOD FOR MULTIPLE TRAFFIC CLASSES

[75] Inventors: Ilias Iliadis, Rueschlikon, Greece; Roch A. Guerin, Yorktown Heights, N.Y.

[73] Assignee: International Business Machines Corporation, Armonk, N.Y.

[21] Appl. No.: 663,091
[22] PCT Filed: Dec. 31, 1993
[86] PCT No.: PCT/EP93/03727
§ 371 Date: Oct. 30, 1996
§ 102(e) Date: Oct. 30, 1996
[87] PCT Pub. No.: WO95/18499
PCT Pub. Date: Jul. 6, 1995

[51] Int. Cl.⁶ .................................................. H04L 12/56
[52] U.S. Cl. ............................................. 370/413; 370/230
[58] Field of Search ........................... 370/229, 230, 370/231, 235, 412, 413, 414

[56] References Cited

U.S. PATENT DOCUMENTS

| | | | |
|---|---|---|---|
| 4,862,451 | 8/1989 | Closs et al. | 370/413 |
| 5,067,074 | 11/1991 | Farel et al. | 370/230 |
| 5,168,492 | 12/1992 | Beshai et al. | 370/413 |
| 5,268,896 | 12/1993 | Pauwels | 370/413 |
| 5,285,445 | 2/1994 | Lehnert et al. | 370/413 |
| 5,361,255 | 11/1994 | Dize et al. | 370/413 |

OTHER PUBLICATIONS

International Conference on Communications, vol. 1, pp. 1033–1037, Jun. 1991.
IEEE Infocom '92 vol. 3, pp. 2280–2289, Jan. 1992.
IEEE Transactions on Communications, vol. COM–29, No. 4, pp. 413–426, Apr. 1981.
Globecom '91, vol. 1, pp. 331–338, Dec. 1991.
IEEE Pacific Rim Conference on Communications, Computers and Signal Processing, vol. 2, pp. 429–432, May 1991.

*Primary Examiner*—Wellington Chin
*Assistant Examiner*—Soon-Dong Hyun
*Attorney, Agent, or Firm*—Douglas W. Cameron

[57] ABSTRACT

In a communication switch with input and output queueing, which handles different priority classes of traffic (e.g. video and audio applications with a high priority, and file transfers and e-mail as low priority traffic), the invention provides a timed shut-off mechanism at each input queue. This mechanism is activated when an input queue attempting to transmit low-priority traffic gets a backpressure signal. The mechanism interrupts further attempts to transmit low priority traffic for a predetermined period of T switching cell cycles. Hence, during the shut-off periods, the output queue is only used by the high priority traffic. Therefore, the performance of the high priority traffic is preserved.

14 Claims, 3 Drawing Sheets

SWITCHING APPARATUS AND METHOD FOR MULTIPLE TRAFFIC CLASSES

The invention relates to a switch for handling data traffic between a plurality of input and output ports. The data traffic comprises at least two different classes of data, i.e., data having different priorities, bandwidth requirements, or different delay sensitivities.

BACKGROUND OF THE INVENTION

Fast switching of information evolves to an increasingly important factor in a broad field of applications ranging from parallel multiprocessor computing to networks for global telecommunication. In spite of the obvious differences in scale and purpose, these applications share fundamental problems growing from the high degree of parallelism involved. Among the most basic problems encountered are those of coordination and contention. With an ever increasing number of participants sharing common media, independently from whether the media are microprocessors, data storages, data buses, copper wires or optical fibers, the coordination of access among these participants becomes an intricate task. Solutions to this task must be seen under the premises of an entire independence of the participants who are only interacting at the very moment they try to gain access to the shared medium.

Deeply interwoven with the problem of coordination is the problem of contention. As a full parallelism of all resources is undesired and uneconomical, the shared resources inevitably form bottlenecks of the involved process. In case of two or more users or participants simultaneously accessing a shared medium, a decision concerning preferences has to be made. The problem of contention, if not solved by a higher degree of parallelism or redundancy, has been tackled in the prior art through basically two mechanisms. These mechanisms can be characterized by being either of statistical nature or using a priority setting. Though the statistical approach is successfully applied in various devices (FIFO—type buffer, CSMA/CD—type data communication protocols, etc.), tendencies towards access schemes with a higher degree of determinism are noticeable. The efforts aimed at the future public Broadband Integrated Services Digital Network (BISDN) provide an illustrative example for these tendencies. Integrated services networks are designed to equally support voice, video and data transmission. These different types of information, being in one case delay sensitive, and of a more bursty character in the other, demand for a different way of handling. A natural solution to the contention problem is therefore found in classifying different types of information into priority categories or equivalents thereof. A classification tag is attached to the "pure" information (payload) triggering the desired way of handling the information classified in this manner. As an example, video and audio applications might be classified as having a high priority, and file transfers and e-mail as low priority traffic.

Before returning to the problems described above, the field of telecommunication will be shortly introduced for the reason of being the predominant area in which high-speed data switches are applied. Developments in this area usually are considered state-of-the-art models for all related fields.

As already indicated above, new and sophisticated telecommunication services like BISDN are giving rise to supporting multimedia applications, including the transmission of data, voice, and video. These services require a high degree of flexibility in bandwidth, which is found to be best provided by packet switching due to its capability to allocate bandwidth dynamically and instantaneously and to efficiently utilize resources by multiplexing. In particular, the Asynchronous Transfer Mode (ATM) which is based on short, fixed-length packets of data, called cells, is expected to be applied as the integrated switching and transmission standard for the future public BISDN. For private networks both ATM and Fast Packet Switching (FPS) based on variable-length packets are under consideration. The desired data transfer rates surpass the 100 Mbit/s limit to peak beyond 1 Gbit/s. Currently, maximum transfer rates of 2.4 Gbit/s are projected. These rates are influenced by the evolution of optical transmission standards such as SONET/SDH.

Advances in Very Large Scale Integration (VLSI) microchip technology allow the development of high-speed switches able to accommodate the future transmission rates. As opposed to conventional packet switches, which are mainly based on software processing, these new advanced packet switches are hardware-based. Their topologies and buffer arrangements for contention resolution employ a high degree of modularity. Their routing function is typically performed in a distributed way at the hardware level which is referred to as self-routing. Examples for advanced packet switching fabrics are known from the following documents.

In the patent U.S. Pat. No. 4,679,190, a multi-stage interconnection network (MIN) is described capable of switching synchronous and asynchronous data packets while insuring that packets with the highest assignable priority will not be blocked at any stage of the switching network. Packets carrying voice information are given a higher priority than other data. The case of contention at any stage of the switch fabric is resolved by letting the packet with higher priority pass first. The data with low priority is blocked and remains in a data buffer of the input adapter (port). Providing buffer space, i.e. memory, at the input adapter is generally known as input queueing. Collisions of packets having the same priority are handled by an arbitration section in accordance with predetermined rules or with a round robin scheme.

The classical input queueing, described above, achieves an inferior throughput than output queueing from a performance point of view. This performance advantage is exploited in a switch as described in U.S. Pat. No. 5,008,878. The basic switch configuration consists of input adapters connected to the switch fabric via input ports. The output ports of the switch fabric are linked to output adapters. At the input adapters, various services from packet switched and circuit switched interfaces (traffic from computers, telephone, and other sources) are collected and converted into uniform minipackets with a packet header, containing routing information designating the desired output port, the length of the payload, and the priority class of the payload. Depackaging is performed at the output adapter. The switch fabric itself is a fast self-routing interconnection network. To each output port a pair of FIFO queueing buffer is assigned. The first buffer of each pair queues the high priority traffic, which must be dispatched within a given cycle time, i.e., circuit switched traffic or required bandwidth traffic, and the second buffer serves low priority or non-reserved bandwidth traffic. The priority scheme is enforced by serving the high priority queue first. Only if no packet is waiting in this queue the second buffer can be connected to the output port.

In an article in the IBM Technical Disclosure Bulletin, vol. 32, no. 10B, March 1990, pp 176–177 entitled "Packet Switching Module", and in the European patent applications EP-A-0 492 025 and EP-A-0 429 026, methods for dynamically allocating buffer space to single output port from a common output storage are described, relaxing further the output port contention, particularly for bursty data traffic. However, output FIFO queues with multiple output ports are difficult to implement and, when built on a VLSI chip, are limited in size and relatively expensive compared to the single-port FIFO buffers of the conventional input queueing concept. The output buffer has to have multiple inputs or to run at a higher speed to resolve output port contention, i.e. to be able to accept cells from multiple inputs during the same switch cycle.

From several other sources, as for example from I. Iliadis and W. Denzel, "Performance of Packet Switches with Input and Output Queueing", IEEE International Conference on Communication, Apr. 16-19, 1990, pp. 316.3.1-7, I. Iliadis, "Head of Line Arbitration of Packet Switches with Combined Input and Output Queueing", Intern. Journal of Digital and Analog Comm. Syst., Vol. 4(1991), pp. 181-190, or H. F. Badran and H. T. Mouftah, "Head of Line Arbitration in ATM Switches with Input-Output Buffering and Backpressure Control", Proc. of GLOBECOM'91, Phoenix, Ariz., Dec. 2-5, 1991, pp. 11.4.1-5, a combination of input and output queueing is suggested with the aim of achieving a high performance/cost ratio by combining moderate amounts of highly efficient, but more expensive output memory with larger amounts of memory at the inputs, which is significantly less expensive but also less efficient. The size of the buffers is predominantly determined by the desired probability of data packet loss. The concept of a combined input and output queueing can be extended to the case of buffered multistage fabrics with each of the stages being supplied with (input) queues of their own. Overflow of the output buffer is treated by a backpressure mechanism which prevents the transmission of incoming packets for the period in which the output buffer can not provide sufficient space. It is enforced by a backpressure signal which causes the packet to wait at the head of the input line.

The occurrence of two or more classes of traffic creates several problems to the switch design: a mechanism to guarantee that within each input queue or buffer the packets are ordered in accordance with their class, respectively, is required. The same holds for the output buffer. This priority sorting within each queue is easy to accomplish as the buffer management of each port, at least in principle, has full information about the status of the incoming or stored packets. A sorting algorithm is described, for example, in U.S. Pat. No. 4,942,569.

If, however, the priority traffic is distributed among a plurality or all inputs, which usually are considered and designed to be independent, yet even shielded from each other, it is cumbersome, costly, and performance corrupting to implement a coordination between the inputs. An ideal solution, which for cost reasons is not considered further, would be to provide separate output queues for each class of traffic inside the switch (two-plane switch).

It is therefore an object of the invention to provide a switching method and apparatus for information traffic of different classes or priorities, in particular for data transfer rates over 100 Mbit/s. More specifically, the invention provides a switching method and apparatus for such a traffic without any coordination among single input lines. In view of the very high speed of the switch, the invention further aims at an implementation with a minimum of hardware components.

SUMMARY OF THE INVENTION

The above mentioned objects are achieved by a communication switch having input ports with input queues and output ports with output queues, comprising control means for detecting an overflow state in said output queues and interrupting means for inhibiting the transmission of at least one class of traffic for a predetermined period T in case of an overflow state. The basic idea of the invention is to interrupt the transmission of data with a lower priority in favor of data having a higher priority directed to the same output port. This interruption is triggered by backpressure from the output buffer or memory, i.e. when incoming packets are rejected, and it lasts for a predetermined period T. The optimal value of T largely depends on system parameters, such as input and output buffer size, the proportion of different traffic classes within the total traffic, etc. The upper limit of T is given by the time, in which the output buffer is certainly emptied. A device able to periodically issue a signal after a time T can easily be provided, for example by an incrementer which registers every switch cycle up to a number corresponding to the value of T, or by a decrementer which is initially set to such a number and issues a signal when it reaches zero.

The complexity of the inventive mechanism is kept minimal to allow its use within high-speed switches in communication networks. It can be implemented without significantly modifying existing switch designs. Advantageously, it exploits existing backpressure schemes which prevent the loss of packets after a complete filling of the output buffer dedicated to one output port. It further avoids providing an extra plane in the switch architecture exclusively handling one class of traffic without introducing a necessity to exchange data between different input lines.

In a preferred embodiment of the invention, the interrupting means are connected to a usual backpressure mechanism. The usual backpressure mechanism is activated if a packet can not be received at an output queue due to a lack of unoccupied memory space. In this case, a signal is returned to the transmitting input indicating the failure to receive the transmitted packet. In contrast to the known backpressure mechanism, which allows the input to retry the transmission of the same packet immediately, i.e. in the next switch cycle, the interrupting means are delaying this retry for the time period T for a low priority packet. Thus, the time period T is triggered for each input line independently by an unsuccessful attempt to transmit a low priority packet.

In a variant of the invention, the backpressure signal is not solely triggering the interrupting means attached to the input port which has unsuccessfully attempted to transmit a low priority packet, but causes the interrupting means to inhibit the transmission of low priority traffic from all input lines, simultaneously.

The preferred embodiments provide a preference of high priority traffic without a need to dedicate part of the output buffer solely to high priority packets. If, however, the size of the buffer allows to reserve part of it exclusively to high priority packets, a backpressure mechanism for low priority traffic can be applied, which is activated in case of the output buffer being filled up to the reserved part. The signal from this low priority backpressure mechanism can then be treated as the described above for the case of the usual backpressure.

The new mechanism can be readily extended to traffic with more than two different classes. In a preferred embodiment involving a multiplicity of traffic classes, for each of the classes (denoted by index i) a different time period $T(i)$ is determined. The values $T(i)$ increase as the class priority decreases. In a variant of this embodiment, different overflow conditions are set for different traffic classes. Thus, only the highest priority class may have access to the entire buffer memory of an output port. Data packets of lower priority class are in contrast allowed to occupy only a part of the buffer memory. The size of this subspace may be restricted according to the traffic class. An overflow state for a traffic class is signaled when a packet of this class (unsuccessfully) attempts to occupy buffer space effectively reserved for higher classes.

In yet another embodiment of the invention, the output buffer or queue of each output port is part of a common storage shared by all output ports. The share of each output (logical queue) can be treated by analogy with an output queue as described above. In addition to the sizes of the single logical queues, the size of the common storage occupied by all logical queues can be monitored to give a further overflow condition.

In the following, implementations of the invention are demonstrated for a few types of existing ATM switches, the details of which are known by persons skilled in the art and are described for example in the patents cited above. It will become obvious that the adaptation of the invention, or of the described embodiments or combinations, thereof, to other known and future switch designs poses a trivial task for a skilled person.

DESCRIPTION OF THE DRAWINGS

The invention is described in detail below with reference to the following drawings.

MODE(S) FOR CARRYING OUT THE INVENTION

Figure 1A:
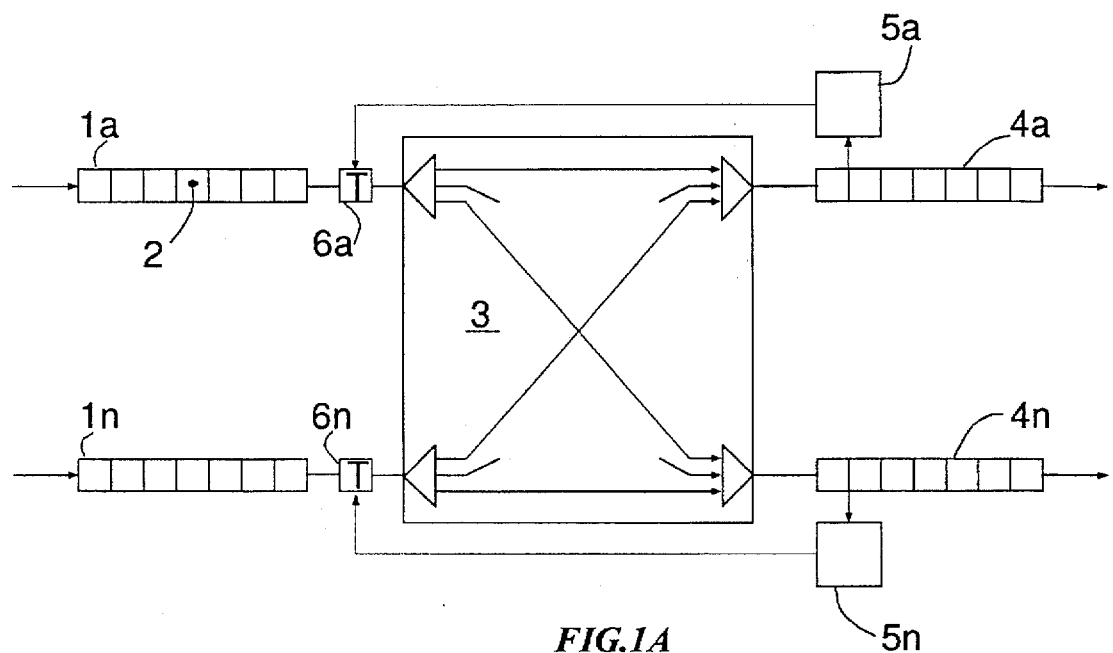
FIG. 1A shows the basic structure of a switch with (dedicated) input and output queues together with the new mechanism.

The basic n×n switch structure as shown in FIG. 1 comprises n input ports or adapters, each of which has an input buffer $1a–1n$ to store the arriving packets of data. Single storage units within the buffer memory are referred to as cells 2. This definition is chosen with respect to the name of data packets in ATM traffic. The switch fabric itself comprises a routing section 3, which passes on the incoming traffic to the requested output port. In packet switching systems, the routing section usually is a non-blocking network driven by the information contained in a header section of the incoming data packet (self-routing). Typical designs of the routing section 3 are known and are of no particular concern with regard to the invention. One of n output buffers $4a–4n$ is solely dedicated to each of the n output lines. Each output buffer is able to receive data from the n inputs $1a–1n$ and able to deliver the stored packets to the attached output port.

To this known parts of the switch, the invention adds controllers $5a–5n$, which compare the actual filling of the output buffers $4a–4n$ with a reference value associated with the capacity of the buffer. In the described example, which uses the full capacity of the buffer, a controller 5 is activated when a packet is attempting to enter the fully occupied buffer 4 of an output. Each controller is connected to a timing device $6a–6n$, able to interrupt the packet transmission from any of the input queues $1a–1n$ for a given time period T. During normal operation, the incoming data through one input channel is split into packets of appropriate size if the incoming data do not have the required format. The packets are located at the input queues $1a–1n$. When reaching the head of line of the input queues, they are transferred through the routing section 3 to the output port of their destination. At the output port, the packet is stored in the first non-occupied cell of the output queue $4a–4n$ for subsequent transmission to the output line.

Usually, the output buffer $4a–4n$ rapidly absorbs any incoming traffic, thus allowing to some extent contention from several input ports without blocking. However, if this tolerance is exhausted and an overflow state occurs, the new mechanism is activated: detecting the failure of an attempted low priority packet transfer, the controller 5 assigned to the output queue in question sends a signal to the timing device 6 of the originating input. A register within the timing device is set to an integer representing the predetermined number T in units of switch cycles, i.e. the time in which one packet is channeled through the switch fabric, which forms a natural time scale for all switching matter. At every switch cycle, the integer is decremented by one. The timing device interrupts the attempts to transmit the low priority packet for T switch cycles. After this period, the attempt is again allowed. In case of another failure to transmit the waiting packet, the mechanism starts again.

Figure 1B:
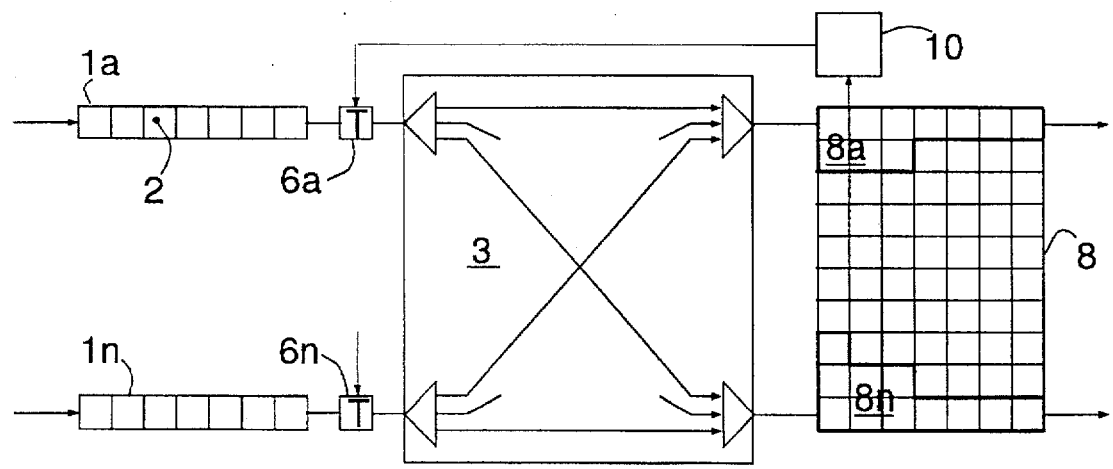
FIG. 1B shows the basic structure of a switch with input queues and a shared output buffer together with the new mechanism.

In the switch of FIG. 1B, the new mechanism is combined with a shared output buffer or memory 8 for all output ports. A controller 10 monitors the buffer 8 by monitoring two values n(t) and q(j, t), which denote the total number of occupied cells inside the shared memory and the total number of occupied cells inside the shared memory which are destined to any one of the output ports j (j=1, . . . , n), respectively. The memory occupied by two output queues $8a$, $8n$ is indicated. The timing devices $6a–6n$ for interrupting the transmission from the input ports are triggered by any of two conditions indicting an overflow state. These conditions are n(t)>Ls and q(j, t)>Lq. For the described example, the limits Ls and Lq are set to 80 and 32, respectively, for a 16×16 switch, i.e. a switch with 16 input and 16 output ports (1≦j≦16). The total output buffer size is restricted to 96 cells, and one output port is allowed to occupy up to 48 cells. If one of the aforementioned conditions is fulfilled, and an input port attempts to transmit a low priority packet, the controller 10 issues a backpressure signal, which triggers the timing device attached to the transmitting input port.

In a variant of this example, the controller issues a signal to all timing devices, simultaneously, thus preventing an attempt to transmit low priority packets from all input ports $1a–1n$ for the period T.

Figure 1C:
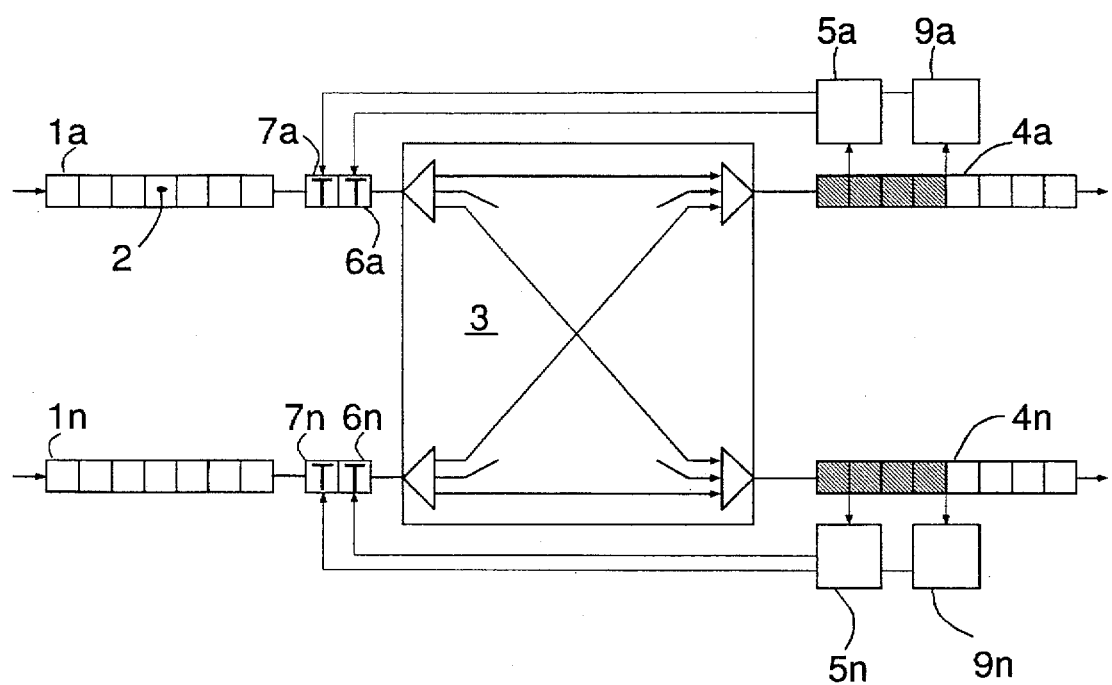
FIG. 1C shows an embodiment of the invention with three different classes of traffic and two different overflow states.

Referring now to FIG. 1C, an example of three different traffic classes is shown. The first two classes are handled with means analogous to those of the first example (FIG. 1A). To the third class, additional control means $9a–9n$ and additional timing means $7a–7n$ are assigned. For this third class of traffic, an overflow state is detected when the output buffers $4a–4n$ are occupied up to a limit which is indicated by the hedged cells of FIG. 1C. The additional timing devices $7a–7n$ are set to a different time as those timers $6a–6n$ which block the second class of traffic.

Figure 2A:
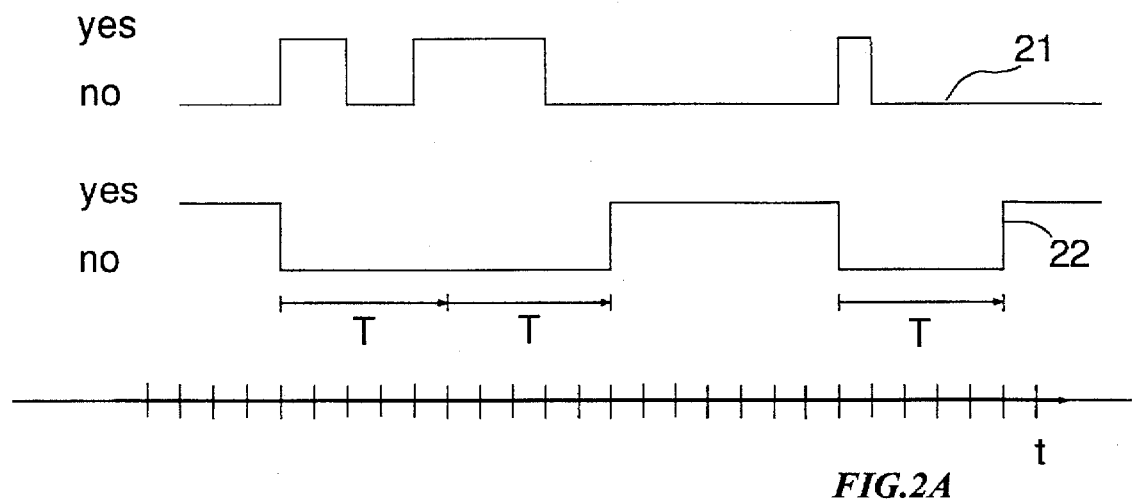
FIG. 2A illustrates the functional principle of the new mechanism in case of two traffic classes.
Figure 2B:
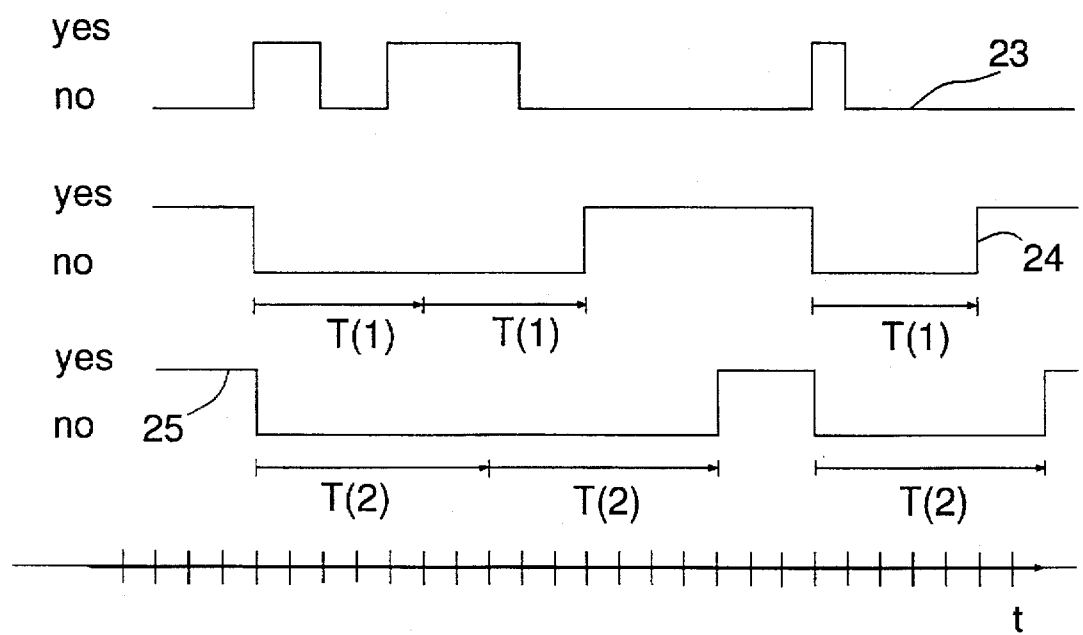
FIG. 2B illustrates the functional principle of the new mechanism in case of three traffic classes.

The new mechanism as illustrated by FIGS. 1A–1C can also be adapted to a switch fabric having multiple (logic)

queues within each input port. Each of these (logic) queues is reserved for one traffic class. Thus, the packets are transmitted from such an input port according to their respective priority. A typical situation is depicted by FIGS. 2A and B, which show the behavior of the low class traffic from an input port in dependence of an overflow state in the buffer of the receiving output port in case of two (FIG. 2A) and three different classes (FIG. 2B) of traffic.

At the occurrence of an overflow state, i.e. level "yes" of the signal 21, the low class traffic is blocked for a period of T (indicated by the status "NO" of signal 22) even when unoccupied cells become available in the output memory during this period, i.e. irrespectively of whether the overflow state ceased during this period, as indicated by level "no" of the overflow signal 21. After time T, another attempt is made to transmit a packet of low class priority traffic. When the packet still or again encounters an overflow state in the output queue or buffer, the attempt is postponed for another period T. This action is repeated until the transmitted packet meets "no" overflow state in the receiving buffer.

The picture does not change in a three class traffic except for the two different time periods T(1) and T(2) involved. As before, class 0 traffic is not interrupted by the new mechanism, whereas class 1 and class 2 traffic is postponed for T(1) or T(2), respectively, as indicated by the signals 24 and 25. The same notation as in FIG. 2A is used for indicating an overflow state (signal 23) in the output buffer. Both periods T(1), T(2) are triggered by the same overflow signal 23. Due to the stochastic nature of the packet transmission, the shorter period T(1) means a higher probability for class 1 traffic for being transmitted as compared to class 2 traffic. Another way of expressing this is to say that on average the switch is open to lower class traffic for a shorter time span.

Performance tests demonstrate that with suitable chosen values of T this mechanism has almost no impact on the throughput of the low priority traffic while guaranteeing the desired quality of service (QOS) for the higher class traffic. This perhaps surprising result reflects the nature of the proposed mechanism as an emergency device only used in states in which the output queue is at least partially filled. The performance of the new mechanism is illustrated for a case with two class traffic, which is separated at the input port into two different input queues, having the size of V and Q, respectively. In the particular serving scheme of this input port, the packets waiting in the high priority queue are generally transmitted first. If, however, a high priority packet arrives while a frame consisting of several low priority packets is in progress of being transmitted, this high priority packet has to wait until the frame transmission is completed. The traffic intensities of the reserved bandwidth and of the non-reserved bandwidth are denoted $\rho_L(RS)$ and $\rho_L(NR)$, respectively. Both values are normalized by the maximum traffic intensity. Values of $\rho_L(RS)=0.8$ and $\rho_L(NR)=0.08$ and 1.00 are assumed to simulate a low intensity of non-reserved traffic and the case of an excessive (misbehaving) non-reserved traffic. The speed of the switch is 52% higher than the speed of the input lines. The allowable loss probability for packets of both classes is set to $10^{-6}$. The following table lists the required size of both logical input queues V and Q (measured in units equal to the average length of a data frame assumed to be equal to 10 packets) for various values of T (measured in switch cycles). The value T=0 corresponds to the case where no control is applied, i.e. to a switch without the inventive mechanism.

TABLE 1

| | Input queue requirements | | | |
|---|---|---|---|---|
| | $\rho_L(NR) = 0.08$ | | $\rho_L(NR) = 1.00$ | |
| T | V | Q | V | Q |
| 0 | 52 | 39 | 115 | ∞ |
| 1 | 47 | 34 | 76 | ∞ |
| 2 | 45 | 31 | 69 | ∞ |
| 3 | 46 | 39 | 67 | ∞ |
| 4 | 46 | 35 | 68 | ∞ |
| 5 | 46 | 33 | 68 | ∞ |
| 6 | 49 | 36 | 68 | ∞ |
| 7 | 47 | 36 | 65 | ∞ |
| 8 | 47 | 37 | 70 | ∞ |
| 9 | 48 | 37 | 72 | ∞ |
| 10 | 49 | 38 | 77 | ∞ |
| 20 | 48 | 36 | 79 | ∞ |
| 100 | 72 | 57 | 118 | ∞ |

If no control is applied at the input ports, the required input queue length V for the reserved bandwidth (RS) traffic is equal to 52 units in case of a low intensity non-reserved traffic. If the new mechanism is applied with a period T ranging between 1 and 10, the required queue size drops to 47 units. The full advantage of the new mechanism, however, becomes apparent in case of an intensive non-reserved traffic. In this case, the required size drops to nearly half from 115 to 65 units. The results of Table 1 suggest to choose the time period T in a range from 1 to 10.

We claim:

1. A switch for a plurality of n different classes of data traffic, comprising input ports with input queues (1a–1n) for storing incoming packets of said data, output ports with output queues (4a–4n; 8) for storing outgoing packets of said data, control means (5a–5n; 9a–9n; 10) for detecting an overflow state of said data packets in at least one of said output queues (4a–4n; 8), backpressure means for, in case of said detected overflow state, preventing at least one of said input queues (1a–1n) from transmitting said data packets to said output queue (4a–4n; 8) in which said overflow state is detected, characterized in that said switch further comprises timing means (6a–6n; 7a–7n) for interrupting for a predetermined period of time (T) an attempt of at least one of the input queues (1a–1n) to transmit at least one of said classes of data traffic to said output queue (4a–4n; 8) in which said overflow state is detected, said timing means (6a–6n; 7a–7n) being triggered by a trigger-signal, emitted by said control means (5a–5n; 9a–9n; 10) in case of said detected overflow state.

2. Switch in accordance with claim 1, characterized in that the transmission of said n classes of data traffic for a number of n predetermined periods of time T(i), (i=1, . . . , n), is interrupted by said timing means (6a–6n; 7a–7n) with each of said periods T(i) being assigned to one of said classes of data traffic.

3. Switch in accordance with claim 1, characterized in that said control means (5a–5n; 9a–9n) is designed for detecting a plurality of said overflow states, each one of said overflow states having a different threshold and being assigned to at least one of said different classes of data traffic.

4. Switch in accordance with claim 1, characterized in that said timing means (6a–6n; 7a–7n) is assigned to each one of said input ports (1 a–1n).

5. Switch in accordance with claim 1, characterized in that said timing means (6a–6n; 7a–7n) comprises a decrementer or incrementer and means for resetting said decrementer or incrementer after a number of switch cycles, said number corresponding to said period of time (T).

6. Switch in accordance with claim 1, characterized by a common storage buffer (8) in which all of said output queues (8a–8n) are stored, and in that said control means (10) is designed for detecting the actual size (n(t)) of the part of said storage buffer (8) occupied by said data packets, and the size (q(j,t)), (j=1, . . . , n), of the part of said storage buffer (8) occupied by said data packets, destined to one of said output queues (8a–8n).

7. Switch in accordance with claim 1, characterized in that each of said input ports (1a–1n) has separate input queues (1a–1n) for pre-sorting said incoming packets of data according to their class of data traffic.

8. Switching method for transmitting a plurality of n different classes of data traffic through a switch having input ports with input queues (1a–1n) for storing incoming packets of data and output ports with output queues (4a–4n; 8) for storing outgoing packets of data, said method comprising the steps of detecting an overflow state of said data packets in at least one of said output queues (4a–4n; 8), in case of said detected overflow state, preventing at least one of said input queues (1a–1n) from transmitting said data packets to said output queue (4a–4n; 8) in which said overflow state is detected, and in case of said overflow state interrupting for a predetermined period of time (T) an attempt to transmit at least one of said classes of data traffic to said output queue (4a–4n; 8) in which said overflow state is detected.

9. Switching method in accordance with claim 8, characterized in that a predetermined period T(i), (i=1, . . . , n), is assigned to each of said n classes of data traffic.

10. Switching method in accordance with claim 9, characterized in that a plurality of said overflow states with different thresholds are assigned to at least one of said different classes of traffic.

11. Switching method in accordance with claim 8, characterized in that the period of time (T) is triggered individually for each one of said input ports (1a–1n).

12. Switching method in accordance with claim 11, characterized in that the period of time (T) is triggered individually for each one of said input ports (1a–1n) by an attempt to transmit a data packet while said overflow state in said receiving output queue (4a–4n; 8) is persistent.

13. Switching method in accordance with claim 8, characterized in that the period of time (T) is simultaneously triggered for all of said input ports (1a–1n).

14. Switching method in accordance with claim 13, characterized in that said period of time (T) is simultaneously triggered for all of said input ports (1a–1n) by an attempt of one of said input ports (1a–1n) to transmit a data packet while an overflow state in the receiving output queue (4a–4n; 8) is persistent.

* * * * *